(12) United States Patent
Yeh

(10) Patent No.: US 9,037,814 B2
(45) Date of Patent: May 19, 2015

(54) FLASH MEMORY MANAGEMENT METHOD AND FLASH MEMORY CONTROLLER AND STORAGE SYSTEM USING THE SAME

(75) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 837 days.

(21) Appl. No.: 12/697,525

(22) Filed: Feb. 1, 2010

(65) Prior Publication Data

US 2011/0145481 A1    Jun. 16, 2011

(30) Foreign Application Priority Data

Dec. 15, 2009    (TW) .............................. 98142976 A

(51) Int. Cl.
*G06F 12/00* (2006.01)
*G06F 12/02* (2006.01)

(52) U.S. Cl.
CPC .... *G06F 12/0246* (2013.01); *G06F 2212/1016* (2013.01); *G06F 2212/7202* (2013.01)

(58) Field of Classification Search
USPC .................................................. 711/156, 103
See application file for complete search history.

(56) References Cited

U.S. PATENT DOCUMENTS 5,603,001 A * 2/1997 Sukegawa et al. ............. 711/103
2009/0222618 A1* 9/2009 Cho .............................. 711/103

FOREIGN PATENT DOCUMENTS

CN    101458956    6/2009

OTHER PUBLICATIONS

"1st Office Action of China Counterpart Application", issued on Mar. 1, 2012, p. 1-p. 6.

* cited by examiner

*Primary Examiner* — Larry Mackall
(74) *Attorney, Agent, or Firm* — J.C. Patents

(57) ABSTRACT

A flash memory management method for managing a plurality of physical units of a flash memory chip is provided. The flash memory management method includes grouping a portion of the physical units into a data area and a spare area; configuring a plurality of logical units and setting mapping relationships between the logical units and the physical units of the data area. The flash memory management method further includes receiving data and writing the data into the physical unit mapped to a second logical unit among the logical units, and the data belongs to a first logical unit among logical units. Accordingly, the flash memory management method can effectively reduce the number of times for organizing valid data, thereby reducing the time for executing a host write-in command.

19 Claims, 17 Drawing Sheets

| | 502a | 502b | 502c |
|---|---|---|---|
| | Logical unit | Physical unit | Storage status |
| | 450-(0) | 304-(0) | Empty |
| | 450-(1) | 304-(1) | Empty |
| | 450-(2) | 304-(2) | Empty |
| | 450-(3) | 304-(3) | Empty |
| | ⋮ | ⋮ | ⋮ |
| | 450-(M-1) | 304-(U-1) | Empty |
| | 450-(M) | 304-(U) | Empty |

| | 502a | 502b | 502c |
|---|---|---|---|
| | Logical unit | Physical unit | Storage status |
| | 450-(0) | 304-(0) | Mother |
| | 450-(1) | 304-(2) | Mother |
| | 450-(2) | 304-(1) | Child |
| | 450-(3) | 304-(3) | Empty |
| | ⋮ | ⋮ | ⋮ |
| | 450-(M-1) | 304-(U-1) | Empty |
| | 450-(M) | 304-(U) | Empty |

FLASH MEMORY MANAGEMENT METHOD AND FLASH MEMORY CONTROLLER AND STORAGE SYSTEM USING THE SAME

CROSS-REFERENCE TO RELATED APPLICATION

This application claims the priority benefit of Taiwan application serial no. 98142976, filed on Dec. 15, 2009. The entirety of the above-mentioned patent application is hereby incorporated by reference herein and made a part of this specification.

BACKGROUND

1. Technology Field

The present invention relates to a flash memory management method and a flash memory controller and a flash memory storage system using the same.

2. Description of Related Art

Along with the widespread of digital cameras, cell phones, and MP3 in recently years, the consumers' demand to storage media has increased drastically. Flash memory is one of the most adaptable memories for such battery-powered portable products due to its characteristics such as data non-volatility, low power consumption, small volume, and non-mechanical structure. A solid state drive (SSD) is a storage device which uses a NAND flash memory as its storage medium. Flash memory has been broadly used for storing important personal data thanks to its small volume and large capacity. Thereby, the flash memory industry has become a very important part of the electronic industry in recent years.

The flash memory chip in a flash memory storage apparatus has a plurality of physical blocks, and each of the physical blocks has a plurality of physical pages, wherein each physical block is an erasing unit of the flash memory chip while each physical page is a writing unit of the flash memory chip. Because a flash memory chip can only be programmed (i.e., written) in a single direction (i.e., the value of a memory cell thereof can only be programmed from 1 to 0), data cannot be directly written into a physical page that has been programmed before (i.e., a page contains data). Instead, the page has to be erased first before it can be programmed. In particular, since a flash memory chip is erased in unit of physical blocks, when a physical page containing old data is to be erased, the entire physical block corresponding to the physical page has to be erased. Since a flash memory is written in unit of physical pages while erased in unit of physical blocks, physical blocks in the flash memory are logically grouped into a system area, a data area, a spare area, and a replacement area by a flash memory controller of the flash memory storage apparatus. The physical blocks in the system area are configured to store important relevant information of the flash memory storage system. On the other hand, the physical blocks in the replacement area are configured to replace the damaged physical blocks in the data area or the spare area. Therefore, under normal access mode, the host system cannot access the physical blocks in the system area and the replacement area. The physical blocks in the data area are used for storing valid data written by write commands, and the physical blocks in the spare area are used for substituting the physical blocks in the data area when the write commands are executed. To be specific, when a flash memory storage apparatus receives a write command and new data corresponding to the write command from a host system and accordingly is about to update a physical block in the data area, the flash memory storage apparatus gets a physical block from the spare area and writes the old valid data stored in the physical block to be updated and the new data into the physical block gotten from the spare area. Then, the flash memory storage apparatus logically associates the physical block containing the new data to the data area and erases the physical block to be updated and logically associates it to the spare area. The flash memory storage apparatus provides logical addresses to the host system in order to allow the host system to smoothly access the physical blocks alternatively used for storing data. More specifically, the flash memory storage apparatus may maintain a logical address-physical address mapping table in which mapping relationships between the logical addresses and the physical blocks in the data area is recorded to reflect the alternation of the physical blocks. Thus, the host system simply writes data into a logical address while the flash memory storage apparatus reads data from or writes data into the physical page of the mapped physical block according to the logical address-physical address mapping table.

Because the flash memory storage apparatus alternatively uses the physical blocks for storing data written by the host system, the flash memory storage apparatus must organize valid data in the physical block of the data area when the number of the physical blocks in the spare area is not enough for storing data. For example, the flash memory controller of the flash memory storage apparatus moves valid data that belongs to the same logical block to the same physical block, thereby releasing the physical block stored invalid data. However, the time for organizing valid data causes the increase of the time for executing a host write-in command. Therefore, when the flash memory storage apparatus frequently organizes valid data stored in the physical blocks of the data area, the performance of the flash memory storage apparatus would be dropped drastically.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a flash memory management method capable of effectively reducing the number of times for organizing valid data and increasing the speed for writing data.

The present invention is directed to a flash memory controller capable of effectively reducing the number of times for organizing valid data and increasing the speed for writing data.

The present invention is directed to a flash memory storage system capable of effectively reducing the number of times for organizing valid data and increasing the speed for writing data.

According to an exemplary embodiment of the present invention, a flash memory management method for managing a plurality of physical units of a flash memory chip is provided. The flash memory management method includes grouping a portion of the physical units into a data area and a spare area. The flash memory management method also includes configuring a plurality of logical units and setting mapping relationships between the logical units and the physical units of the data area, wherein each of the logical units maps one of the physical units in the data area. The flash memory management method still includes marking storage statuses of the physical units mapped to the logical units as empty statuses. The flash memory management method further includes receiving a first data; writing the first data into a first physical unit among the physical units; and marking the storage status of the first physical unit as a mother status, wherein the first data belongs to a first logical unit among the logical units and the first logical unit maps to the first physical unit.

According to an exemplary embodiment of the present invention, a flash memory management method for managing a plurality of physical units of a flash memory chip is provided. The flash memory management method includes grouping a portion of the physical units into a data area and a spare area; configuring a plurality of logical units and setting mapping relationships between the logical units and the physical units of the data area, wherein each of the logical units maps one of the physical units in the data area. The flash memory management method further includes receiving a first data; and writing the first data into a physical unit mapped to a second logical unit among the logical units, wherein the first data belongs to a first logical unit among the logical units and the first logical unit is different from the second logical unit.

According to an exemplary embodiment of the present invention, a flash memory controller for managing a plurality of physical units of a flash memory chip is provided. The flash memory controller includes a microprocessor unit, a flash memory interface unit, a host interface unit, and a memory management unit. The flash memory interface unit is coupled to the microprocessor unit for coupling to the flash memory chip. The host interface unit is coupled to the microprocessor unit and configured for coupling to the host system. The memory management unit is coupled to the microprocessor unit. Herein the memory management unit groups a portion of the physical units into a data area and a spare area. The memory management unit configures a plurality of logical units and sets mapping relationships between the logical units and the physical units of the data area, wherein each of the logical units maps one of the physical units in the data area. The flash memory management unit marks storage statuses of the physical units mapped to the logical units as empty statuses. And, the host interface unit is configured to receive a first data, wherein the first data belongs to a first logical unit among the logical units and the first logical unit maps to a first physical unit among the physical units. Furthermore, the memory management unit writes the first data into the first physical unit mapped to the first logical unit and marks the storage status of the first physical unit as a mother status.

According to an exemplary embodiment of the present invention, a flash memory controller for managing a plurality of physical units of a flash memory chip is provided. The flash memory controller includes a microprocessor unit, a flash memory interface unit, a host interface unit, and a memory management unit. The flash memory interface unit is coupled to the microprocessor unit for coupling to the flash memory chip. The host interface unit is coupled to the microprocessor unit and configured for coupling to the host system. The memory management unit is coupled to the microprocessor unit. Herein the memory management unit at least groups a portion of the physical units into a data area and a spare area; configures a plurality of logical units and sets mapping relationships between the logical units and the physical units of the data area, wherein each of the logical units maps one of the physical units in the data area. Moreover, the host interface unit is configured to receive a first data, wherein the first data belongs to a first logical unit among the logical units. And, the memory management unit writes the first data into a physical unit mapped to a second logical unit among the logical units, wherein the first logical unit is different from the second logical unit.

According to an exemplary embodiment of the present invention, a flash memory storage system including a flash memory chip, a connector, and a flash memory controller is provided. The flash memory chip has a plurality of physical units. The connector is configured to couple to a host system. The flash memory controller is coupled to the flash memory chip and the connector. The flash memory controller at least groups a portion of the physical units into a data area and a spare area. Additionally, the flash memory controller configures a plurality of logical units and sets mapping relationships between the logical units and the physical units of the data area, wherein each of the logical units maps one of the physical units in the data area. And, the flash memory controller marks storage statuses of the physical units mapped to the logical units as empty statuses. Furthermore, the flash memory controller is configured to receive a first data, wherein the first data belongs to a first logical unit among the logical units and the first logical unit maps to a first physical unit among the physical units. The flash memory controller writes the first data into the first physical unit mapped to the first logical unit and marks the storage status of the first physical unit as a mother status.

According to an exemplary embodiment of the present invention, a flash memory storage system including a flash memory chip, a connector, and a flash memory controller is provided. The flash memory chip has a plurality of physical units. The connector is configured to couple to a host system. The flash memory controller is coupled to the flash memory chip and the connector. Herein the flash memory controller at least groups a portion of the physical units into a data area and a spare area; configures a plurality of logical units and sets mapping relationships between the logical units and the physical units of the data area, wherein each of the logical units maps one of the physical units in the data area. Moreover, the flash memory controller is configured to receive a first data, wherein the first data belongs to a first logical unit among the logical units. And, the flash memory controller writes the first data into a physical unit mapped to a second logical unit among the logical units, wherein the first logical unit is different from the second logical unit.

As described above, the flash memory management method provided by the exemplary embodiment of the present invention is capable of effectively reducing the number of times for organizing valid data and thereby reducing the time for executing a host write-in command.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5 is a diagram illustrating an example of a logical unit-physical unit mapping table according to the first exemplary embodiment of the present invention.

FIG. 8 is a diagram illustrating another example of the logical unit-physical unit mapping table according to the first exemplary embodiment of the present invention.

DESCRIPTION OF EMBODIMENTS

Figure 1A:
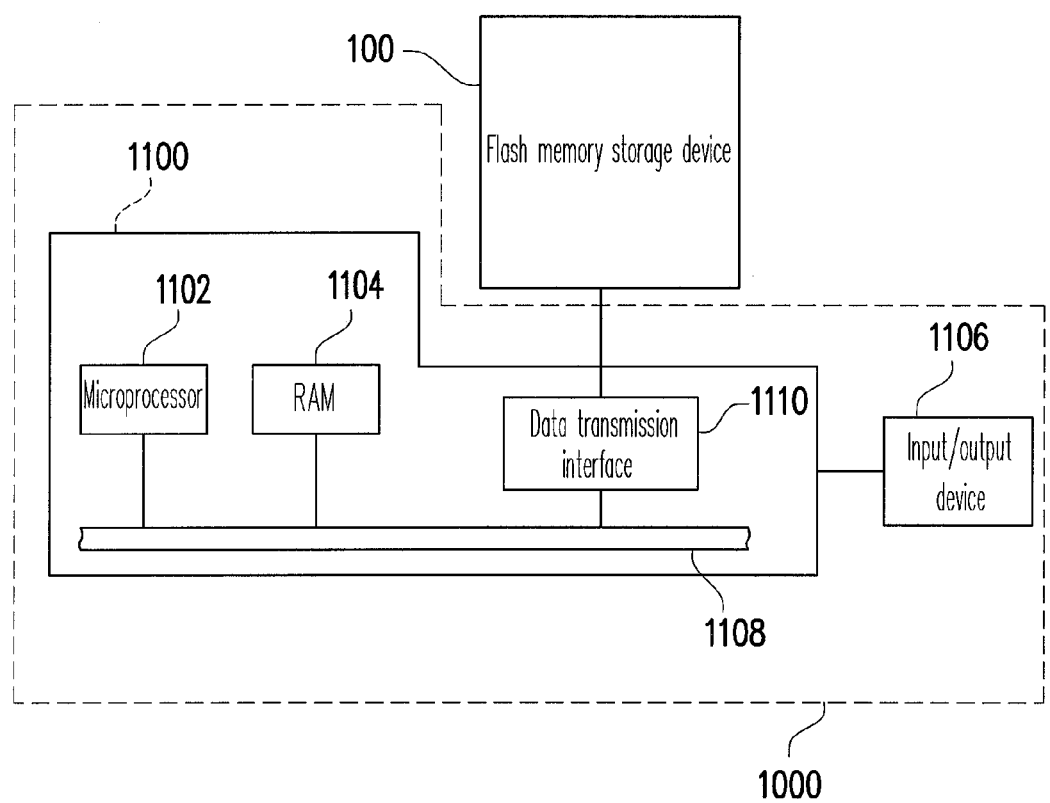
FIG. 1A is a schematic block diagram of a host system using a flash memory storage apparatus according to a first exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

Flash memory storage apparatus (i.e., a flash memory storage system), typically, includes a flash memory chip and a controller (i.e., a control circuit). The flash memory storage device is usually used together with a host system so that the host system can write data into or read data from the flash memory storage apparatus. In addition, a flash memory storage apparatus also includes an embedded flash memory and a software that can be executed by a host system and substantially served as a controller of the embedded flash memory.

FIG. 1A is a schematic block diagram of a host system using a flash memory storage apparatus according to a first exemplary embodiment of the present invention.

Figure 1B:
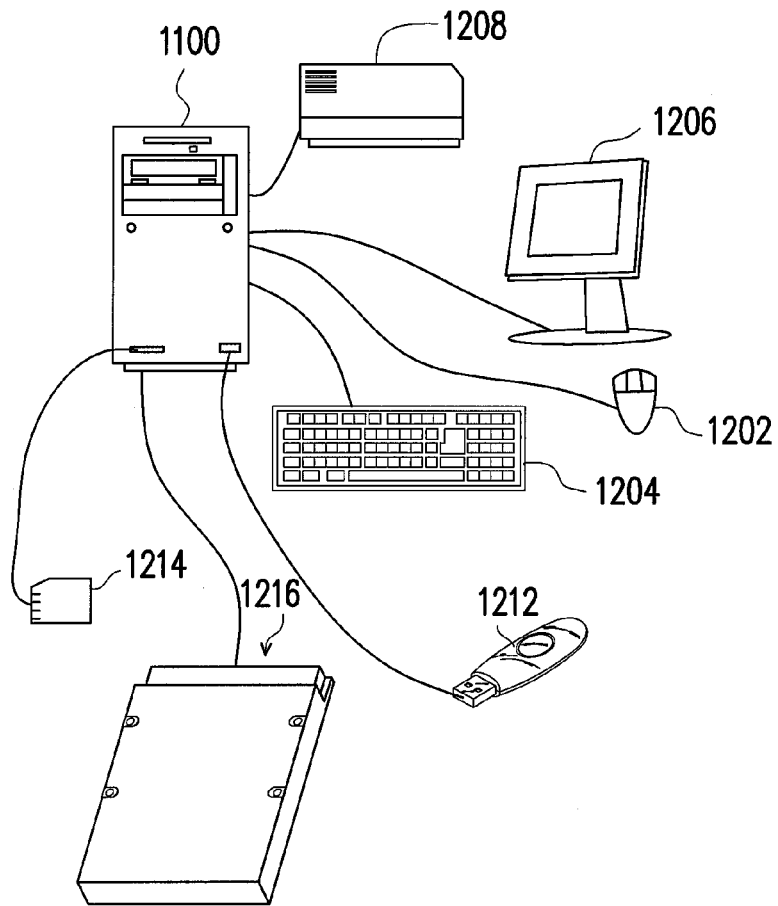
FIG. 1B illustrates a diagram of a computer, an input/output (I/O) device, and a flash memory storage apparatus according to an exemplary embodiment of the invention.

Referring to FIG. 1A, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. It should be understood that the devices illustrated in FIG. 1B are not intended to limit the scope of the I/O device 1106, and the I/O device 1106 may further include other devices.

In the embodiment of the present invention, the flash memory storage apparatus 100 is coupled to the other devices of the host system 1000 through the data transmission interface 1110. By using the microprocessor 1102, the random access memory (RAM) 1104 and the Input/Output (I/O) device 1106, the data can be write into the flash memory storage apparatus 100 or can be read from the flash memory storage apparatus 100. The flash memory storage apparatus 100 may be a flash drive 1212, a memory card 1214, or a solid state drive (SSD) 1216, as shown in FIG. 1B.

Figure 1C:
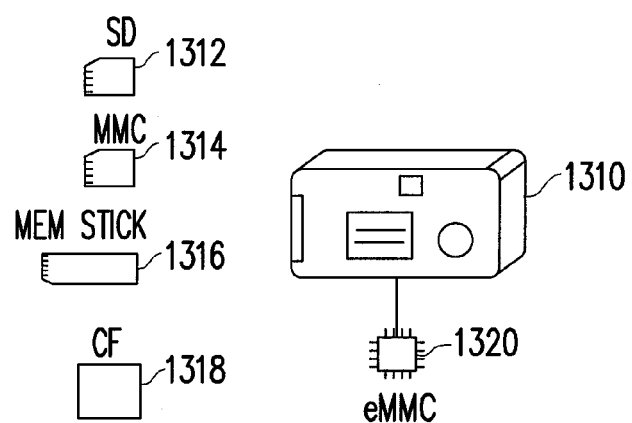
FIG. 1C illustrates a diagram of a host system and a flash memory storage apparatus according to another exemplary embodiment of the invention.

Generally, the host system 1000 substantially can be any system capable of storing data. Even though the host system 1000 is described as a computer system in the present exemplary embodiment, in another exemplary embodiment of the invention, the host system 1000 may also be a digital camera, a video camera, a communication device, an audio player, or a video player, and etc. For example, if the host system 1000 is a digital camera 1310, the flash memory storage apparatus 100 is then a SD card 1312, a MMC card 1314, a memory stick 1316, a CF card 1318, or an embedded storage device 1320 used in the digital camera 1310 (as shown in FIG. 1C) The embedded storage device 1320 includes an embedded MMC (eMMC). It should be mentioned that the eMMC is directly coupled to a substrate of the host system 1000.

Figure 2:
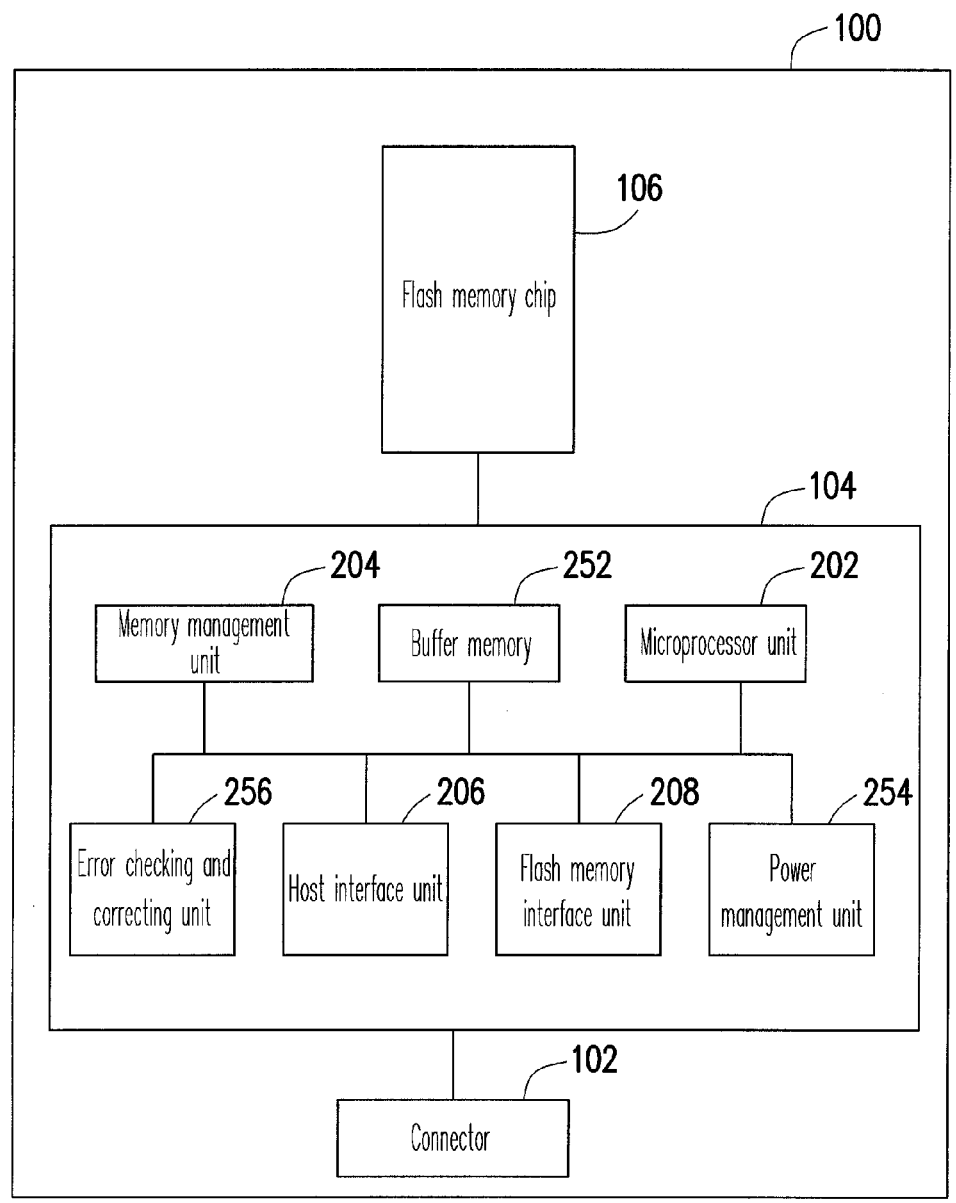
FIG. 2 is a detailed block diagram of the flash memory storage apparatus in FIG. 1A.

FIG. 2 is a detailed block diagram of the flash memory storage apparatus in FIG. 1A.

Referring to FIG. 2, the flash memory storage apparatus 100 includes a connector 102, a flash memory controller 104, and a flash memory chip 106.

The connector 102 is coupled to the flash memory controller 104 and used for coupling to the host system 1000. In the present exemplary embodiment, the connector 102 is a serial advanced technology attachment (SATA) connector. However, it should be noticed that the present invention is not limited to the aforementioned description and the connector 102 also can be a Parallel Advanced Technology Attachment (PATA) connector, a universal serial bus (USB) connector, an institute-of-electrical-and-electronic-engineers (IEEE) 1394 connector, a peripheral-component Interconnect-express (PCI Express) connector, a secure digital (SD) interface connector, a memory stick (MS) interface connector, a multi-media-card (MMC) interface connector, a compact flash (CF) interface connector, an integrated-device-electronics (IDE) connector or other suitable type of connectors.

The flash memory controller 104 executes a plurality of logic gates or control commands implemented in a hardware manner or a firmware manner and performs various data operations such as data writing, reading, and erasing in the flash memory chip 106 according to commands of the host system 1000. The flash memory controller 104 includes a microprocessor unit 202, a memory management unit 204, a host interface unit 206 and a flash memory interface unit 208.

The microprocessor unit 202 is a main control unit of the flash memory controller 104. The microprocessor unit 202 cooperates with the memory management unit 204, the host interface unit 206, and the flash memory interface unit 208 to carry out various operations of the flash memory storage apparatus 100.

The memory management unit 204 is coupled to the microprocessor unit 202, and executes a data writing mechanism and a flash memory management mechanism according to the present exemplary embodiment. Below, the operation of the memory management unit 204 is described in detail with reference to accompanying drawings.

In the present exemplary embodiment, the memory management unit 204 is implemented in the flash memory controller 104 in a firmware form. For example, the memory management unit 204 including a plurality of control instructions is burned into a program memory (for example, a read only memory (ROM)), and the program memory is embedded into the flash memory controller 104. When the flash memory storage apparatus 100 is in operation, the control instructions of the memory management unit 204 are executed by the microprocessor unit 202 to accomplish the data writing mechanism and the flash memory management mechanism according to the present exemplary embodiment.

In another exemplary embodiment of the present invention, the control commands of the memory management unit 204 are also stored in a specific area (for example, the system area of a flash memory chip exclusively used for storing system data) of the flash memory chip 106 as program codes. Similarly, the control commands of the memory management unit 204 are executed by the microprocessor unit 202 when the flash memory storage apparatus 100 is in operation. In addition, in yet another exemplary embodiment of the present invention, the memory management unit 204 may also be implemented in the flash memory controller 104 in a hardware form.

The host interface unit 206 is coupled to the microprocessor unit 202, and configured for receiving and identifying commands and data from the host system 1000. Namely, the commands and data from the host system 1000 are transmitted to the microprocessor unit 202 through the host interface unit 206. In the present exemplary embodiment, the host interface unit 206 is a SATA interface corresponding to the connector 102. However, it should be understood that the invention is not limited thereto, and the host interface unit 206 can also be a PATA interface, a USB interface, an IEEE 1394 interface, a PCI express interface, a SD interface, a MS interface, a MMC interface, a CF interface, an IDE interface, or other suitable data transmission interfaces.

The flash memory interface unit 208 is coupled to the microprocessor unit 202 and configured for accessing the flash memory chip 106. Namely, data to be written into the flash memory chip 106 is converted by the flash memory interface unit 208 into a format acceptable to the flash memory chip 106.

Additionally, in another exemplary embodiment of the present invention, the flash memory controller 104 further includes a buffer memory 252, a power management unit 254, and an error checking and correcting unit 256.

The buffer memory 252 is coupled to the microprocessor unit 202 and configured to temporarily store data and commands from the host system 1000 or data from the flash memory chip 106.

The power management unit 254 is coupled to the microprocessor unit 202, and configured to control the power supply of the flash memory storage apparatus 100.

The error checking and correcting unit 256 is coupled to the microprocessor unit 202, and configured for executing an error checking and correcting procedure to ensure data accuracy. To be specific, when the memory management unit 204 receives a host write-in command from the host system 1000, the error checking and correcting unit 256 generates an error checking and correcting (ECC) code for the data corresponding to the host write-in command, and the memory management unit 204 writes the data and the corresponding ECC code into the flash memory chip 106. Subsequently, when the memory management unit 204 reads the data from the flash memory chip 106, the memory management unit 204 simultaneously reads the corresponding ECC code, and the error checking and correcting unit 256 executes the error checking and correcting procedure on the data read according to the ECC code.

Referring to FIG. 2 again, the flash memory chip 106 is coupled to the flash memory controller 104 and used for storing data. The flash memory chip 106 has a plurality of physical units. In the present exemplary embodiment, each physical unit is composed of one physical block. However, the present invention is not limited thereto, and in another exemplary embodiment of the present invention, each physical unit may be composed of two or more physical blocks. In flash memory designs, a smallest unit for erasing data is one physical block. That is to say, each physical block contains the least number of memories that are erased together. Each physical block has a plurality of physical addresses. In the present exemplary embodiment, one physical address is one physical page, but the present invention is not limited thereto. Generally, one physical page is the minimum unit for programming. In other words, each physical page is the smallest unit for writing data or reading data. Each physical page usually includes a user data bit area and a redundant bit area. The user data bit area is used for storing user data, and the redundant bit area is used for storing system data (for example, the ECC code). In the present exemplary embodiment, the flash memory chip 106 is a multi level cell (MLC) NAND flash memory chip. However, the present invention is not limited thereto, and the flash memory chip 106 may also be a single level cell (SLC) NAND flash memory chip.

Figure 3:
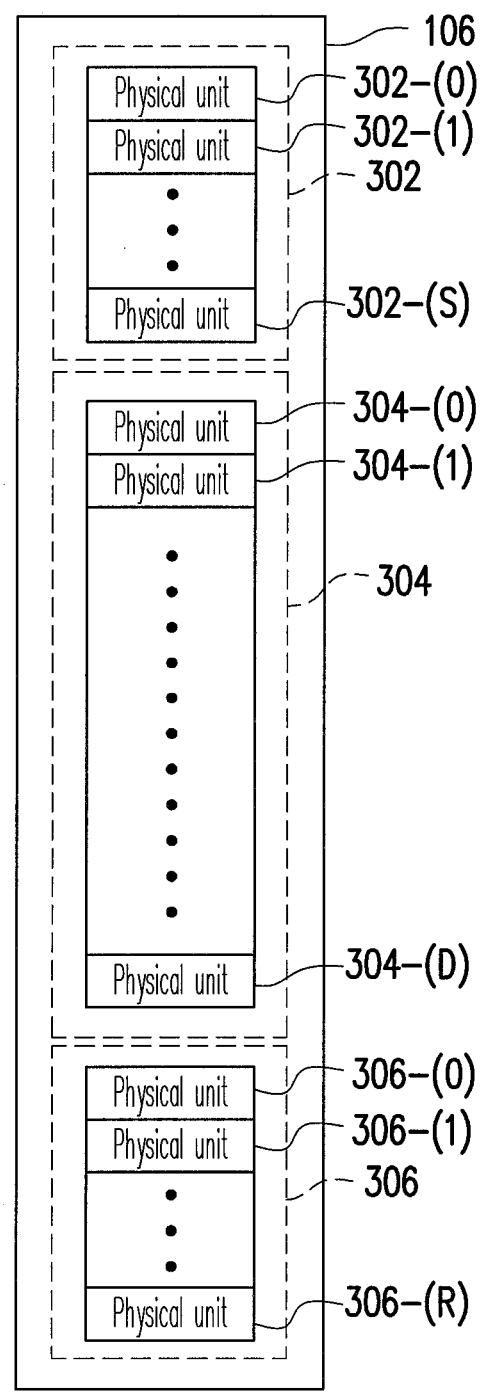
FIG. 3 is a diagram of managing a flash memory chip according to the first exemplary embodiment of the present invention.

FIG. 3 is a diagram of managing a flash memory chip according to the first exemplary embodiment of the present invention.

It should be understood that the terms used herein for describing the operations (for example, "get", "select", "replace", "group", and "alternate", etc) performed on the physical blocks of a flash memory refer to logical operations performed on these physical blocks. Namely, the physical blocks in the flash memory are only logically operated and the actual positions thereof are not changed.

Referring to FIG. 3, the memory management unit 204 logically groups the physical units into a system area 302, a storage area 304, and a replacement area 306.

The physical units 302-(0)~302-(S) logically belonging to the system area 302 are used for recording system data, such as the manufacturer and model of the flash memory chip.

The physical units 304-(0)~304-(D) logically belonging to the storage area 304 are used for storing data written by the host system 1000. Namely, the flash memory storage apparatus 100 uses the physical units in the storage area 304 for actually storing data written by the host system 1000.

The physical units 306-(0)~306-(R) logically belonging to the replacement area 306 are replacement physical units. For example, when the flash memory chip 106 is manufactured in the factory, 4% of the physical units thereof are reserved for replacement. Namely, when the physical units in the system area 302 and the storage area 304 are damaged, the physical units reserved in the replacement area 306 can be used for replacing the damaged physical units (i.e., bad units). Thus, if there are still normal physical units in the replacement area 306 and a physical unit is damaged, the memory management unit 204 gets a normal physical unit from the replacement area 306 for replacing the damaged physical unit. If there is no more normal physical unit in the replacement area 306 and a physical unit is damaged, the flash memory storage apparatus 100 is announced as being in a write-protect status and cannot be used for writing data anymore.

Herein, S, D and R are positive integers, and represent serial numbers and the numbers of the physical units in the system area 302, storage area 304 and replacement area 306, respectively. In particular, the numbers of the physical units in the system area 302, storage area 304 and replacement area 306 are various based on different flash memory chips. Additionally, it has to be understood that the grouping relationships of grouping the physical units into the system area 302, the storage area 304, and the replacement area 306 are dynamically changed during the operation of the flash memory storage apparatus 100. For example, when a physical unit in the storage area is damaged and replaced by a physical unit in the replacement area, the physical unit in the replacement area is associated to the storage area.

Figure 4:
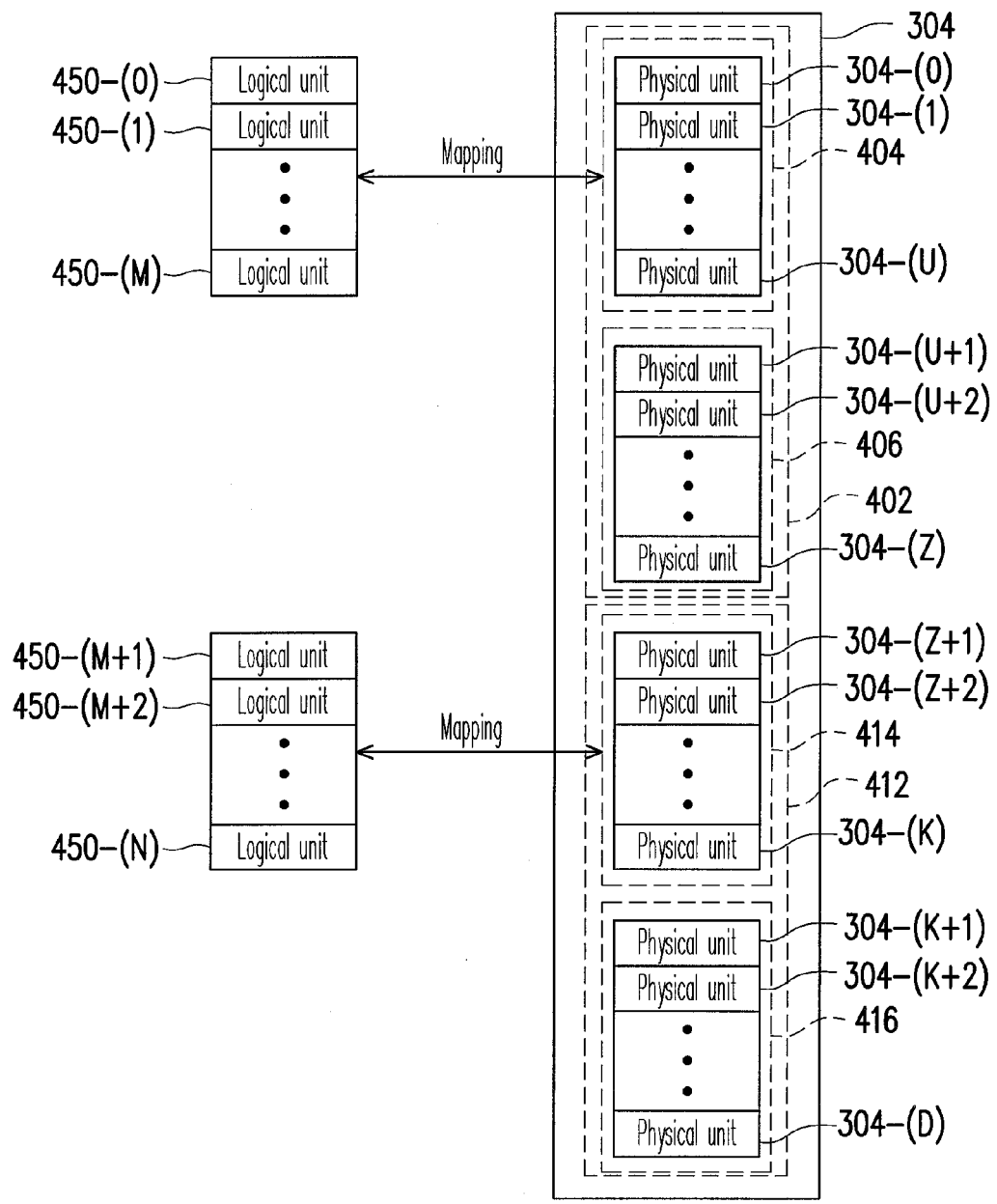
FIG. 4 is a diagram of managing physical units of a storage area according to the first exemplary embodiment of the present invention.

FIG. 4 is a diagram of managing physical units of a storage area according to the first exemplary embodiment of the present invention.

Referring to FIG. 4, the memory management unit 204 logically groups the physical units of the storage area 304 into a zone 402 and a zone 412 for managing respectively. To be specific, during operations of writing data and reading data, the memory management unit 204 considers each of the zones as an individual operating zone for managing the physical units. Herein, grouping the physical units into several zones for managing can effectively reducing resources needed for managing the flash memory chip 106, such as the size of buffer memory. In the present exemplary embodiment, the memory management unit 204 groups the physical units 304-(0)~304-(D) of the storage area into 2 zones for managing, but it should be noticed that the present invention is not limited thereto. In another exemplary embodiment of the present invention, the memory management unit 204 may consider all of the physical units of the storage area as one zone for managing or group the physical units of the storage area into more zones for managing.

As shown in FIG. 4, the memory management unit 204 groups the physical units in each zone into a data area and a spare area. For example, the physical unit 304-(0)~304-(Z) in the zone 402 is grouped into the physical units 304(0)~304(U) associated to a data area 404 and the physical units 304(U+1)~304(Z) associated to a spare area 406, and the physical unit 304-(Z+1)~304-(D) in the zone 412 is grouped into the physical units 304(Z+1)~304(K) associated to a data area 414 and the physical units 304(K+1)~304(D) associated to a spare area 416.

The physical units of the data area are used for storing data written by the host system 1000. And, the physical units of the spare area are used for substituting the physical units of the data area. Hence, the physical units in the spare area are either blank or available units (i.e., no data is recorded in these units or data recorded in these units is marked as invalid data). In other words, the physical units in the data area and the spare area are alternatively used to store data written into the flash memory storage apparatus 100 by the host system 1000. For example, when the host system 1000 is about to store data in the flash memory storage apparatus 100, the memory management unit 204 gets a physical unit from the spare area to write data, and the gotten physical unit is associated to the data area. And, when the physical unit in the data area is erased, the erased physical unit is associated to the spare area.

Because the memory management unit 204 alternatively uses the physical units of the storage area 304 to store data written by the host system 1000, logical units are configured for each zone to changeably map to the physical units such that the host system 1000 can successfully access data.

For example, the memory management unit 204 configures logical unit 450-(0)~450-(M) to map to the physical units associated to the data area 404 of the zone 402, and configures logical unit 450-(M+1)~450-(N) to map to the physical units associated to the data area 414 of the zone 412.

In the present exemplary embodiment, the size of one logical unit is equal to that of one physical unit, and each logical unit has several logical addresses to map to the physical addresses (i.e., physical pages). Namely, the size of one logical address is equal to that of one physical address. As described above, the programming for a flash memory is in unit of each physical address, thus the memory management unit 204 writes data written by the host system 1000 into the flash memory chip 106 in unit of each logical address.

It should be noted that the operation system of the host system 1000 access data in unit of logical access addresses. For example, one logical access address is one sector or one cluster. However, in the flash memory storage apparatus 100, data is programmed into the flash memory chip 106 in unit of each physical address. Therefore, the memory management unit 204 provides a transformation mechanism to transform a logical access address accessed by the host system 100 to the corresponding logical address and logical unit. For example, in the present exemplary embodiment, the memory management unit 204 makes 4 logical access addresses to correspond to one logical address. For example, the memory management unit 204 may use a mathematics formula to set a logical address corresponding to each logical access address. Namely, the capacity of one logical address may be used for storing data corresponding to 4 logical access addresses. It should be understood that the present invention is not limited thereto, and one logical address may corresponds to 8 logical access addresses or 16 logical access addresses.

In the present exemplary embodiment, the memory management unit 204 establishes and maintains logical unit-physical unit mapping tables for the zones to record the mapping relationships between the logical units and the physical units, respectively.

In particular, in the present exemplary embodiment, the memory management unit 204 marks the storage statuses of the physical units mapped to the logical units in the logical unit-physical unit mapping tables. To be specific, when the flash memory storage apparatus 100 is formatted, the flash memory management unit 204 maps each of the logical units to one of the physical units and marks the storage statuses of the physical units mapped to the logical units as empty statuses. That is to say, after the flash memory storage apparatus 100 is formatted, even though each of the logical units has mapped to one of the physical units, the physical units mapped to the logical units actually does not store any data.

Below, several examples are used for explaining the mechanism of managing the flash memory chip 106 by the memory management unit 204. It should be understood that even though the mechanism is explained by using the physical units of the data area 404 and the spare area 406 in the zone 402, the mechanism can be applied in the physical units of the data area 414 and the spare area 416 in the zone 412.

FIG. 5 is a diagram illustrating an example of a logical unit-physical unit mapping table according to the first exemplary embodiment of the present invention.

Referring to FIG. 5, a logical unit-physical unit mapping table 502 is configured for recording mapping relationships between the physical units of the data area 404 in the zone 402 and the logical units 450-(0)~450-(M). The logical unit-physical unit mapping table 502 has a logical unit field 502a, a physical unit field 502b and a storage status field 502c. The physical unit field 502b is configured for recording the physical units mapped to the logical units recorded in the logical unit field 502a, and the storage status field 502c is configured for recording the storage statuses of the physical units mapped to the logical units recorded in the logical unit field 502a.

As described above, when the flash memory storage apparatus 100 is formatted, the flash memory management unit 204 maps the logical units 450-(0)~450-(M) to one of physical units of the data area 404, respectively, and marks the storage statuses of these physical units as "empty" statuses.

Figure 6:
FIG. 6 is a diagram illustrating another example of the logical unit-physical unit mapping table according to the first exemplary embodiment of the present invention.

FIG. 6 is a diagram illustrating another example of the logical unit-physical unit mapping table according to the first exemplary embodiment of the present invention.

When, under the status shown in FIG. 5, the host system 1000 is about to store data at a logical access address of a logical address corresponding to the logical unit 450-(0), the memory management unit 204 identifies that the logical unit 450-(0) currently maps to the physical unit 304-(0) and the storage status of the physical unit 304-(0) is recorded as the "empty" status according to the logical unit-physical unit mapping table 502. Accordingly, the memory management unit 204 writes the data into the physical unit 304-(0) according to the sequence of the physical addresses, and changes the storage status of the physical unit 304-(0) as a "mother" status. Here, a storage status of a physical unit being recorded as the "mother" status represents that data stored in the physical unit belongs to the logical unit mapped to the physical unit.

Figure 7:
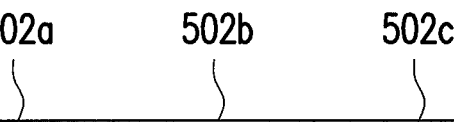
FIG. 7 is a diagram illustrating another example of the logical unit-physical unit mapping table according to the first exemplary embodiment of the present invention.

FIG. 7 is a diagram illustrating another example of the logical unit-physical unit mapping table according to the first exemplary embodiment of the present invention.

When, under the status shown in FIG. 6, the host system 1000 is about to store data at a logical access address of a logical address corresponding to the logical unit 450-(0), the memory management unit 204 identifies that the logical unit 450-(0) currently maps to the physical unit 304-(0) and the storage status of the physical unit 304-(0) is recorded as the "mother" status according to the logical unit-physical unit mapping table 502. Accordingly, the memory management unit 204 determines whether the physical unit 304-(0) is filled with data. If the physical unit 304-(0) is not filled with data, the memory management unit 204 determines the empty storage space of the physical unit 304-(0) (i.e., the storage space without storing any data) is enough to store the data to be written by the host system 1000. If the empty storage space of the physical unit 304-(0) is enough to store the data to be written by the host system 1000, the memory management unit 204 writes the data into the physical unit 304-(0) according to the sequence of the physical addresses.

If the empty storage space of the physical unit 304-(0) is not enough to store the data to be written by the host system 1000, the memory management unit 204 identifies that storage status of the physical unit 304-(1) is recorded as the "empty" status according to the logical unit-physical unit mapping table 502 and writes the data into the physical unit 304-(1) according to the sequence of the physical addresses. In particular, the memory management unit 204 changes the storage status of the physical unit 304-(1) as a "child" status in the logical unit-physical unit mapping table 502 (as shown in FIG. 7). Herein, a storage status of a physical unit being recorded as the "child" status represents that data stored in the physical unit does not belong to the logical unit mapped to the physical unit.

FIG. 8 is a diagram illustrating another example of the logical unit-physical unit mapping table according to the first exemplary embodiment of the present invention.

When, under the status shown in FIG. 7, the host system 1000 is about to store data at a logical access address of a logical address corresponding to the logical unit 450-(1), the memory management unit 204 identifies that the logical unit 450-(1) currently maps to the physical unit 304-(1) and the storage status of the physical unit 304-(1) is recorded as the "child" status according to the logical unit-physical unit mapping table 502. Accordingly, the memory management unit 204 identifies that the storage status of the physical unit 304-(2) is recorded as the "empty" status according to the logical unit-physical unit mapping table 502 and writes the data into the physical unit 304-(2) according to the sequence of the physical addresses. In particular, the memory management unit 204 re-maps the logical unit 450-(1) to the physical unit 304-(2), changes the storage status of the physical unit 304-(2) as the "mother" status, and re-maps the logical unit 450-(2) to the physical unit 304-(1) in the logical unit-physical unit mapping table 502, wherein the storage status of the physical unit 304-(1) still be kept as the "child" status (as shown in FIG. 8).

Additionally, in the exemplary embodiment, the memory management unit 204 respectively establishes random tables for the logical units to record the physical addresses mapped to the logical address. As described above, when the host system 1000 is about to store data at a logical access address of a logical address in the corresponding logical unit, the memory management unit 204 orderly writes the data into the physical addresses of the physical unit mapped to the corresponding logical unit, or orderly writes the data into the physical addresses of the physical unit mapped to other logical unit. Therefore, under a status where logical addresses of one logical unit do not map to the physical address within the same physical unit according to the sequence thereof, the memory management unit 204 records physical addresses mapped to logical addresses by maintaining the random tables. That is, when the host system 1000 is about to access data at a logical address, the memory management unit 204 accesses the data at a corresponding physical address according to the corresponding random table.

Figure 9:
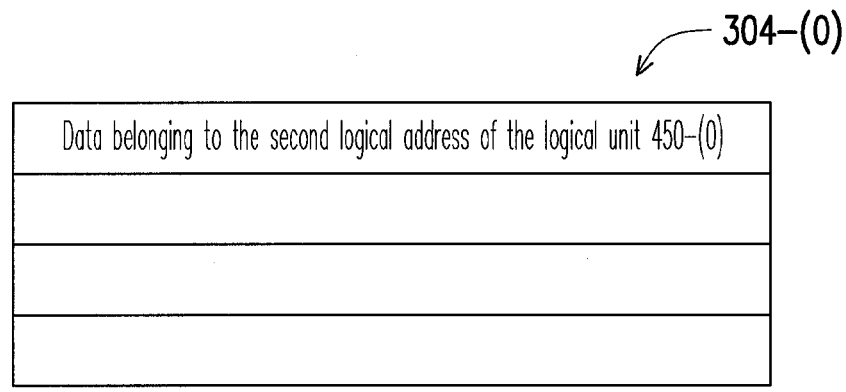
FIG. 9 is a diagram illustrating an example of writing data according to the first embodiment of the present invention.
Figure 10:
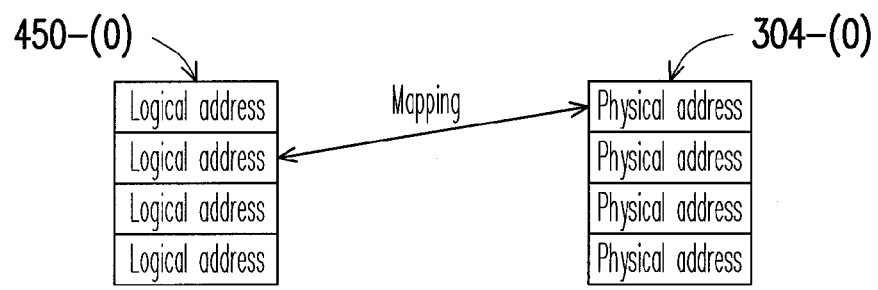
FIG. 10 is a diagram illustrating an example of mapping relationships between logical addresses and physical addresses according to the first exemplary embodiment of the present invention.

FIG. 9 is a diagram illustrating an example of writing data according to the first embodiment of the present invention, and FIG. 10 is a diagram illustrating an example of mapping relationships between logical addresses and physical addresses according to the first exemplary embodiment of the present invention. In order to explain easily, in an example as follows, it is assumed that each logical unit has 4 logical addresses and each physical unit has 4 physical addresses. However, it is not limited in the present invention, and in a real case the number of logical addresses within each logical unit and the number of physical addresses within each physical unit may be 64, 128, 256, or other suitable values.

Referring to FIG. 9, When, under a status where all the storage statuses of the physical units are recorded as the "empty" statuses, the host system 1000 is about to store data at a second logical address of the logical unit 450-(0), the memory management unit 204 writes the data belonging to the second logical address of the logical unit 450-(0) into a first physical address of the physical unit 304-(0) mapped to the logical unit 450-(0) according to the sequence of the physical addresses.

Referring to FIG. 10, at this time, the second logical address of the logical unit 450-(0) is mapped to the first physical address of the physical unit 304-(0) in the random table of the logical unit 450-(0).

Figure 11:
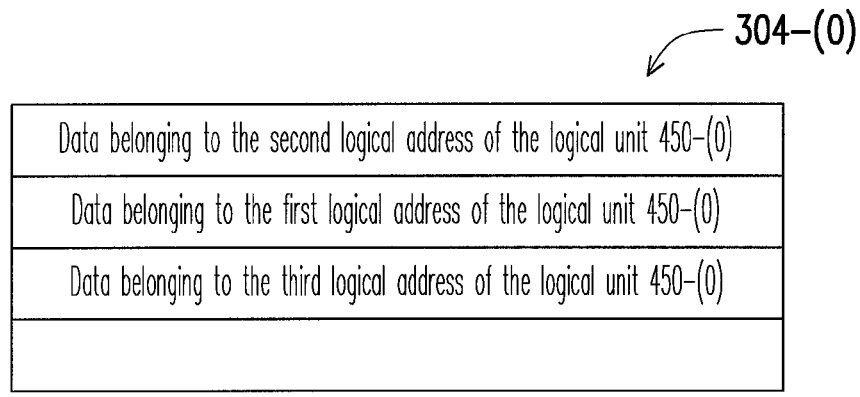
FIG. 11 is a diagram illustrating another example of writing data according to the first embodiment of the present invention.
Figure 12:
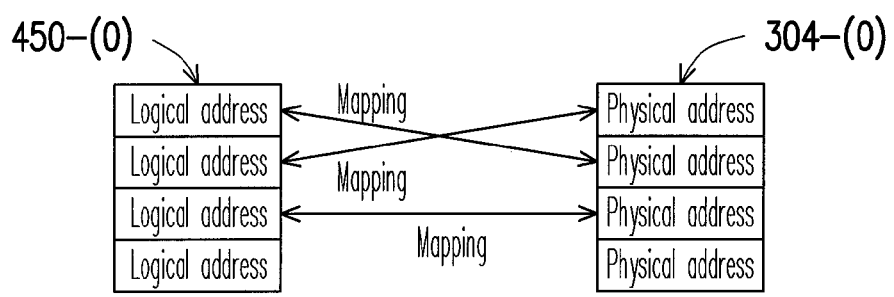
FIG. 12 is a diagram illustrating another example of mapping relationships between logical addresses and physical addresses according to the first exemplary embodiment of the present invention.

FIG. 11 is a diagram illustrating another example of writing data according to the first embodiment of the present invention, and FIG. 12 is a diagram illustrating another example of mapping relationships between logical addresses and physical addresses according to the first exemplary embodiment of the present invention.

Referring to FIG. 11, when, under the status shown in FIG. 9, the host system 1000 is about to store data at a first logical address and a third logical address of the logical unit 450-(0), the memory management unit 204 writes the data belonging to the first logical address of the logical unit 450-(0) into a second physical address of the physical unit 304-(0) mapped to the logical unit 450-(0) and writes the data belonging to the third logical address of the logical unit 450-(0) into a third physical address of the physical unit 304-(0) according to the sequence of the physical addresses.

Referring to FIG. 12, at this time, the second logical address of the logical unit 450-(0) is mapped to the first physical address of the physical unit 304-(0), the first logical address of the logical unit 450-(0) is mapped to the second physical address of the physical unit 304-(0), and the third logical address of the logical unit 450-(0) is mapped to the third physical address of the physical unit 304-(0) in the random table of the logical unit 450-(0).

Figure 13:
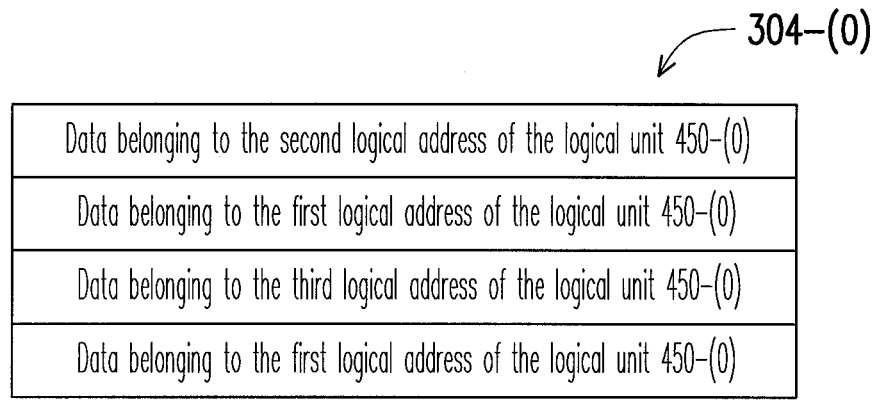
FIG. 13 is a diagram illustrating another example of writing data according to the first embodiment of the present invention.
Figure 14:
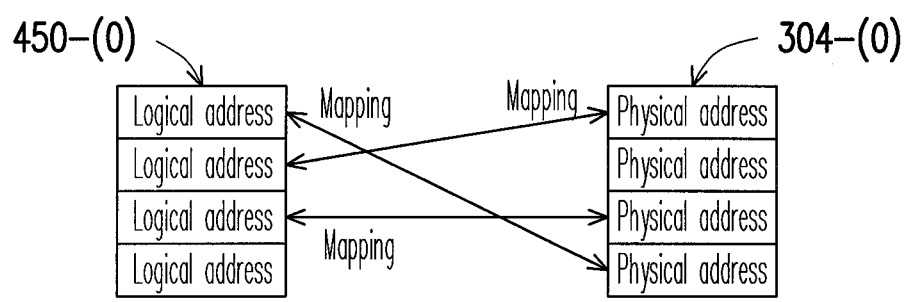
FIG. 14 is a diagram illustrating another example of mapping relationships between logical addresses and physical addresses according to the first exemplary embodiment of the present invention.

FIG. 13 is a diagram illustrating another example of writing data according to the first embodiment of the present invention, and FIG. 14 is a diagram illustrating another example of mapping relationships between logical addresses and physical addresses according to the first exemplary embodiment of the present invention.

Referring to FIG. 13, When, under the status shown in FIG. 11, the host system 1000 is about to store new data at a first logical address of the logical unit 450-(0), the memory management unit 204 writes the new data belonging to the first logical address of the logical unit 450-(0) into a fourth physical address of the physical unit 304-(0) mapped to the logical unit 450-(0) according to the sequence of the physical addresses.

Referring to FIG. 14, at this time, the second logical address of the logical unit 450-(0) is mapped to the first physical address of the physical unit 304-(0), the third logical address of the logical unit 450-(0) is mapped to the third physical address of the physical unit 304-(0), and the first logical address of the logical unit 450-(0) is mapped to the fourth physical address of the physical unit 304-(0) in the random table of the logical unit 450-(0).

Figure 15:
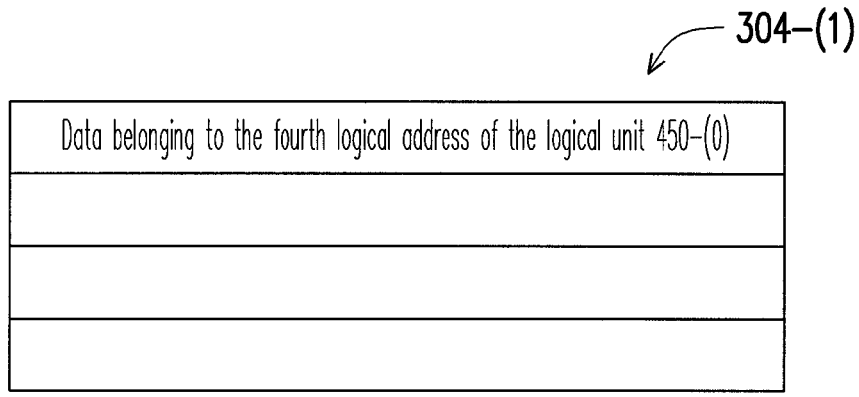
FIG. 15 is a diagram illustrating another example of writing data according to the first exemplary embodiment of the present invention.
Figure 16:
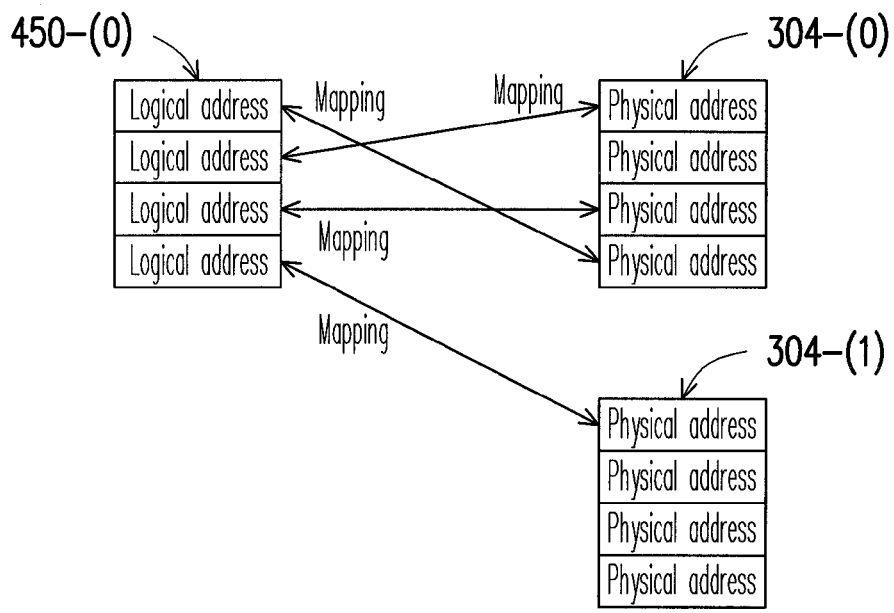
FIG. 16 is a diagram illustrating another example of mapping relationships between logical addresses and physical addresses according to the first exemplary embodiment of the present invention.

FIG. 15 is a diagram illustrating another example of writing data according to the first embodiment of the present invention, and FIG. 16 is a diagram illustrating another example of mapping relationships between logical addresses and physical addresses according to the first exemplary embodiment of the present invention.

Referring to FIG. 15, When, under the status shown in FIG. 13, the host system 1000 is about to store new data at a fourth logical address of the logical unit 450-(0), because the physical unit 304-(0) is filled with data and the storage status of the physical unit 304-(1) mapped to the logical unit 450-(1) is the "empty" status, the memory management unit 204 writes the new data into a first physical address of the physical unit 304-(1) according to the sequence of the physical addresses.

Referring to FIG. 16, at this time, the second logical address of the logical unit 450-(0) is mapped to the first physical address of the physical unit 304-(0), the third logical address of the logical unit 450-(0) is mapped to the third physical address of the physical unit 304-(0), the first logical address of the logical unit 450-(0) is mapped to the fourth physical address of the physical unit 304-(0), and the fourth logical address of the logical unit 450-(0) is mapped to the first physical address of the physical unit 304-(1) in the random table of the logical unit 450-(0).

Accordingly, when the host system 1000 is about to access data at a logical address of a logical unit within a zone, the memory management unit 204 accesses the data at a mapped physical address according to the corresponding logical unit-physical unit mapping table and the corresponding random table.

In an exemplary embodiment of the present invention, the memory management unit 204 records storage statuses of the physical addresses, respectively. To be specific, as described above, the erasing operation is performed in unit of each physical unit (or each physical block), thus the memory management unit 204 records the storage statuses of the physical addresses to identify whether data stored in each of the physical addresses is valid.

For example, as shown in FIG. 11, when the second physical address of the physical unit 304-(0) is used for storing data belonging to the first logical address of the logical unit 450-(0), the storage status of the second physical address of the physical unit 304-(0) is marked as a "valid data" status. After that, as shown in FIG. 13, when the host system 1000 stores new data into the first logical address of the logical unit 450-(0) and the fourth physical address of the physical unit 304-(0) is used for storing the new data, the storage status of the fourth physical address of the physical unit 304-(0) is marked as the "valid data" status and the storage status of the second physical address of the physical unit 304-(0) is marked as an "invalid data" status.

In particular, in the exemplary embodiment of the present invention, when the host system 1000 deletes data stored in a logical address, the memory management unit 204 marks the storage status of a physical address mapped to the logical address as the "invalid data" status. For example, the memory management unit 204 is informed which logical addresses that data thereon is deleted by the host system 1000 through trim commands transmitted by Microsoft Windows Seven Operating System installed in the host system 1000.

It should be noted that when the host system 1000 is about to store new data at a logical unit and a physical unit mapped to the logical unit is filled with data while there is no any physical unit whose the storage status is the "empty" status, the memory management unit 204 gets a physical unit from the spare area and write the new data into the gotten physical unit. In particular, at this time, the memory management unit 204 performs a valid data organization procedure to release a physical unit only storing invalid data.

To be specific, when the memory management unit 204 performs a valid data organization procedure to the logical unit, valid data belonging to the logical unit is moved to a physical unit gotten from the spare area and a physical unit originally used for storing the data of the logical unit is erased. In particular, in the valid data organization procedure, the physical unit whose storage status originally recorded as the "child" status among the erased physical units is re-marked as "empty" status, and the physical unit whose the storage status originally recorded as the "mother" status among the erased physical units is associated to the spare area. Additionally, the logical unit is re-mapped to the gotten physical unit, and the gotten physical unit is associated to the data area and the storage status of the gotten physical unit is marked as "mother" status.

Figure 17:
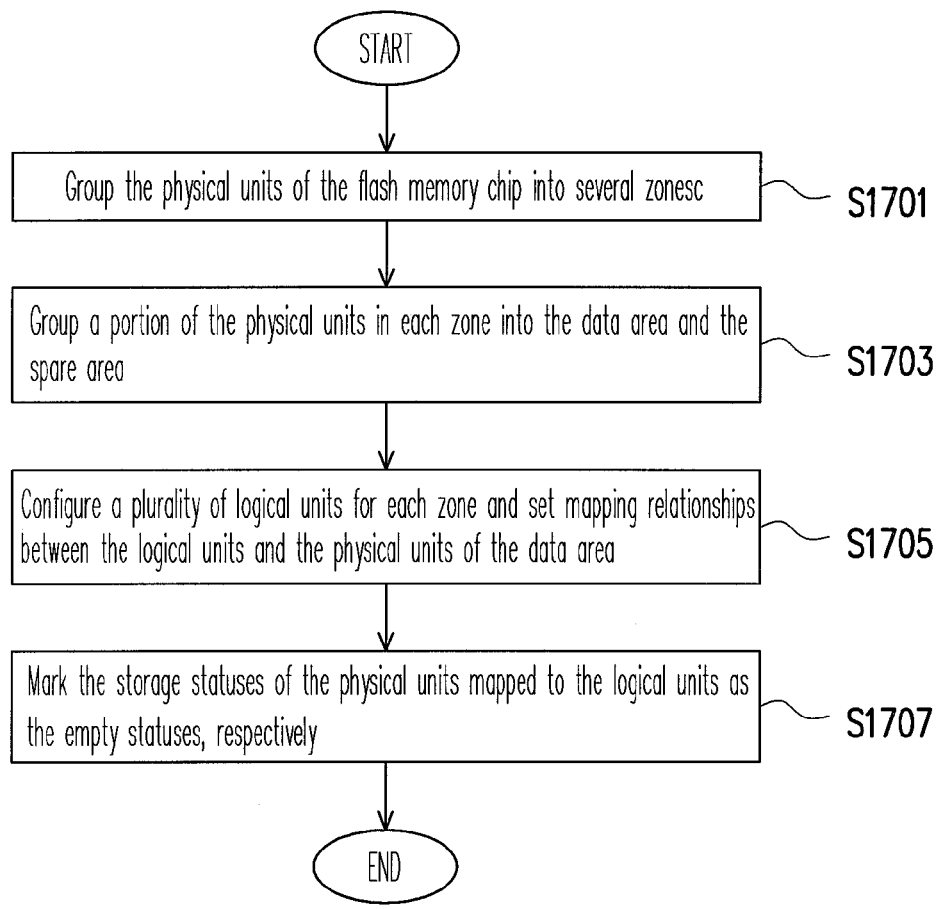
FIG. 17 is a flow chart illustrating a flash memory management method according to the first exemplary embodiment of the present invention.

FIG. 17 is a flow chart illustrating a flash memory management method according to the first exemplary embodiment of the present invention.

Referring to FIG. 17, when the flash memory storage apparatus 100 is formatted, the memory management unit 204 groups the physical units of the flash memory chip into several zones (S1701), and groups a portion of the physical units in each zone into the data area and the spare area (S1703).

After that, in step S1705, the memory management unit 204 configures a plurality of logical units for each zone and sets mapping relationships between the logical units and the physical units of the data area. Finally, in step S1707, the memory management unit 204 marks the storage statuses of the physical units mapped to the logical units as the empty statuses, respectively.

The grouping of the physical units and the configuring of the logical units in the steps shown in FIG. 17 have been explained above, detailed descriptions are omitted.

Figure 18:
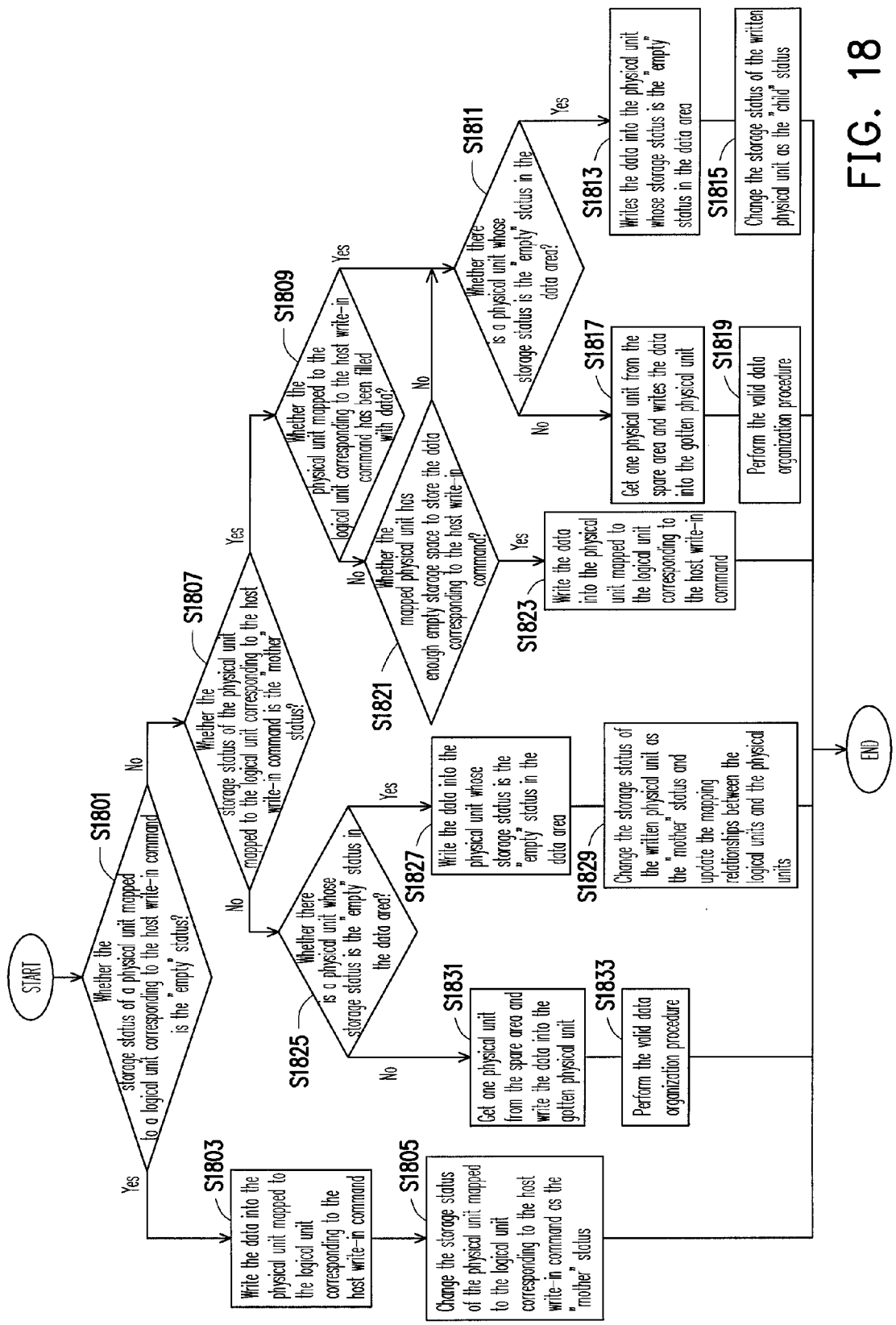
FIG. 18 is another flow chart illustrating the flash memory management method according to the first exemplary embodiment of the present invention.

FIG. 18 is another flow chart illustrating the flash memory management method according to the first exemplary embodiment of the present invention, wherein steps of executing a host write-in command after the flash memory storage apparatus 100 is initiated according to the steps shown in FIG. 17.

Referring to FIG. 18, when the flash memory storage apparatus 100 receives a host write-in command and data corresponding to the host write-in command from the host system 1000 via the connector 102, first, in the step S1801, the memory management unit 204 determines whether the storage status of a physical unit mapped to a logical unit corresponding to the host write-in command is the "empty" status.

If it is determined in step S1801 that the storage status of the physical unit mapped to the logical unit corresponding to the host write-in command is the "empty" status, the memory management unit 204 writes the data into the physical unit mapped to the logical unit corresponding to the host write-in command (S1803), and changes the storage status of the physical unit mapped to the logical unit corresponding to the host write-in command as the "mother" status (S1805).

If it is determined in step S1801 that the storage status of the physical unit mapped to the logical unit corresponding to the host write-in command is not the "empty" status, the memory management unit 204 determines whether the storage status of the physical unit mapped to the logical unit corresponding to the host write-in command is the "mother" status (S1807).

If it is determined in step S1807 that the storage status of the physical unit mapped to the logical unit corresponding to the host write-in command is the "mother" status, the memory management unit 204 determines whether the physical unit mapped to the logical unit corresponding to the host write-in command has been filled with data (S1809).

If it is determined in step S1809 that the physical unit mapped to the logical unit corresponding to the host write-in command has been filled with data, the memory management unit 204 determines whether there is a physical unit whose storage status is the "empty" status in the data area (e.g., the data area 404) (S1811). If there is a physical unit whose storage status is the "empty" status in the data area, the memory management unit 204 writes the data into the physical unit whose storage status is the "empty" status in the data area (S1813), and changes the storage status of the written physical unit as the "child" status (S1815).

If it is determined in step S1811 that there is no any physical unit whose storage status is the "empty" status in the data area, the memory management unit 204 gets one physical unit from the spare area (e.g., the spare area 406) and writes the data into the gotten physical unit (S1817). After that, in step S1819, the memory management unit 204 performs the valid data organization procedure.

If it is determined in step S1809 that the physical unit mapped to the logical unit corresponding to the host write-in command has not been filled with data, the memory management unit 204 determines whether the mapped physical unit has enough empty storage space to store the data corresponding to the host write-in command (S1821). If the mapped physical unit has enough empty storage space to store the data corresponding to the host write-in command, the memory management unit 204 writes the data into the physical unit mapped to the logical unit corresponding to the host write-in command (S1823). If the mapped physical unit has not enough empty storage space to store the data corresponding to the host write-in command, then step S1811 is executed.

If it is determined in step S1807 that the storage status of the physical unit mapped to the logical unit corresponding to the host write-in command is not the "mother" status, the memory management unit 204 determines whether there is a physical unit whose storage status is the "empty" status in the data area (e.g., the data area 404) (S1825). If there is a physical unit whose storage status is the "empty" status in the data area, the memory management unit 204 writes the data into the physical unit whose storage status is the "empty" status in the data area (S1827), and changes the storage status of the written physical unit as the "mother" status and updates the mapping relationships between the logical units and the physical units (S1829) (e.g., as shown in FIG. 8).

If it is determined in step S1825 that there is no any physical unit whose storage status is the "empty" status in the data area, the memory management unit 204 gets one physical unit from the spare area (e.g., the spare area 406) and writes the data into the gotten physical unit (S1831). After that, in step S1833, the memory management unit 204 performs the valid data organization procedure.

Accordingly, in the exemplary embodiment of the present invention, when there is a physical unit that has not store data in the data area, the memory management unit 204 uses the physical unit that has not store data in the data area to store data written by the host system 1000. Thus, the number of times for organizing valid data is effectively reducing, thereby enhancing the performance of the flash memory storage apparatus.

Second Exemplary Embodiment

A flash memory storage apparatus and a host system of the second exemplary embodiment substantially is the same as the flash memory storage apparatus and the host system of the first exemplary embodiment. Here, the drawings of the first exemplary embodiment are used for describing the second exemplary embodiment of the present invention.

In the present exemplary embodiment, the flash memory chip 106 is a multi level cell (MLC) NAND flash memory chip. Therefore, the programming of the MLC NAND flash memory chip is divided into several phases. Taking a 2 level cell NAND flash memory as an example, the physical units thereof are programmed in two phases. The first phase is the programming of a lower physical page, and the physical property of the programming of the lower physical page is similar to the physical property of the programming of the SLC NAND flash memory chip. After the first phase is completed, the programming of an upper physical page may be executed (i.e. the second phase). It should be noted that the speed of programming the lower page is faster than that of programming the upper page. Therefore, physical pages in each physical unit may be categorized into slow physical pages (i.e., upper physical pages) and fast physical pages (i.e., lower physical pages).

Similarly, in an 8 level cell or a 16 level cell, each memory cell contains more bits and accordingly is programmed in more phases. Herein, the physical pages having the fastest programming speed are defined as the "fast physical pages", and all other physical pages having slower programming speed are defined as the "slower physical pages". For example, the "slower physical pages" may include a plurality of physical pages having different programming speeds. Additionally, in other cases, the "slower physical pages" may been defined as the physical pages having the slowest programming speed, or the physical pages having the slowest programming speed and some of the physical pages having faster programming speeds than the slowest programming speed. For example, in a 4-level memory cell, the fast physical pages are defined as the physical pages having the fastest and the second fastest programming speed, while the slow physical pages are defined as the physical pages having the slowest and the second slowest programming speed.

In the present exemplary embodiment, when the host system 1000 is about to store data into a logical unit (e.g., the logical unit 450-(0)) and the memory management unit 204 uses a physical unit that does not map the logical unit (as the example shown in FIG. 7), the memory management 204 only uses the fast physical pages (i.e., the fast physical addresses) of the physical unit for writing the data.

Figure 19:
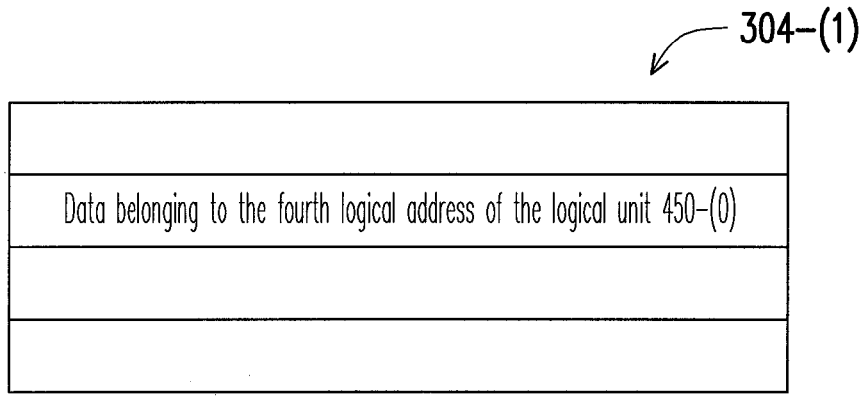
FIG. 19 is a diagram illustrating an example of writing data according to a second exemplary embodiment of the present invention.
Figure 20:
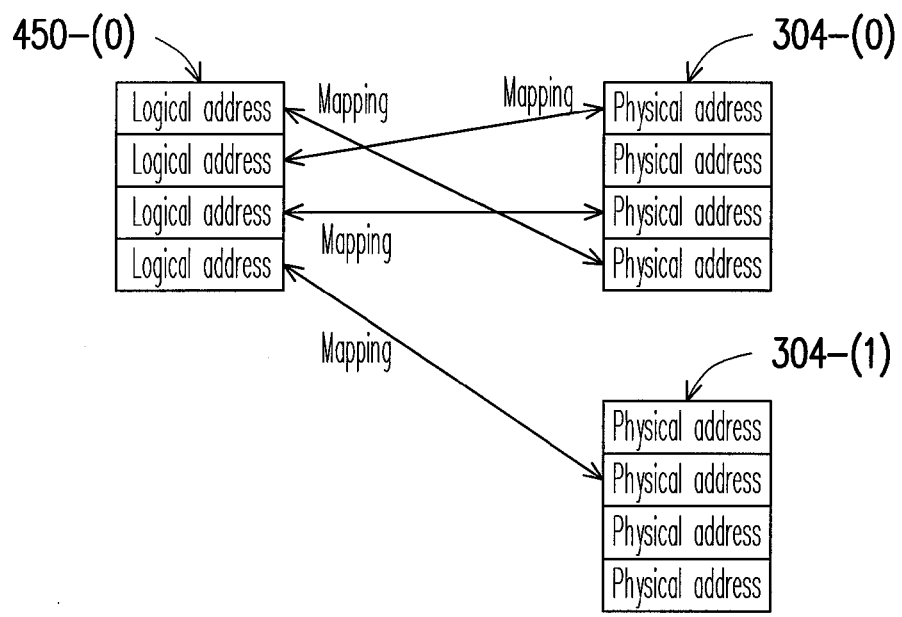
FIG. 20 is a diagram illustrating an example of mapping relationships between logical addresses and physical addresses according to the second exemplary embodiment of the present invention.

FIG. 19 is a diagram illustrating an example of writing data according to the second embodiment of the present invention, and FIG. 20 is a diagram illustrating an example of mapping relationships between logical addresses and physical addresses according to the second exemplary embodiment of the present invention.

Referring to FIG. 19, When, under the status shown in FIG. 13, the host system 1000 is about to store new data at a fourth logical address of the logical unit 450-(0), because the physical unit 304-(0) is filled with data and the storage status of the physical unit 304-(1) mapped to the logical unit 450-(1) is the "empty" status, the memory management unit 204 writes the new data into the physical unit 304-(1) according to the sequence of the physical addresses. In particular, in a case where that the first and the third physical addresses of the physical unit 304-(1) are the slow physical addresses, and the second and the fourth physical addresses of the physical unit 304-(1) are the fast physical addresses, the memory management 204 writes the data into the second physical address of the physical unit 304-(1).

Referring to FIG. 20, at this time, the second logical address of the logical unit 450-(0) is mapped to the first physical address of the physical unit 304-(0), the third logical address of the logical unit 450-(0) is mapped to the third physical address of the physical unit 304-(0), the first logical address of the logical unit 450-(0) is mapped to the fourth physical address of the physical unit 304-(0), and the fourth logical address of the logical unit 450-(0) is mapped to the second physical address of the physical unit 304-(1) in the random table of the logical unit 450-(0).

Similarly, if the host system 1000 then is about to store new data at a second logical address of the logical unit 450-(0), the memory management unit 204 writes the new data into a fourth physical address of the physical unit 304-(1) according to the sequence of the physical addresses. That is, the memory management unit 204 only uses the fast physical addresses of the physical unit 304-(1) to write data.

Accordingly, in the exemplary embodiment of the present invention, when a physical unit that does not map to the corresponding logical unit is used for storing data, the memory management unit 204 only uses the fast physical addresses of the physical unit to write the data. Accordingly, the speed of writing data can effectively be increased.

Third Embodiment

A flash memory storage apparatus and a host system of the third exemplary embodiment substantially is the same as the flash memory storage apparatus and the host system of the first exemplary embodiment. Here, the drawings of the first exemplary embodiment are used for describing the third exemplary embodiment of the present invention.

As described above, the memory management unit 204 logically groups the physical units 304-(0)~304-(D) of the storage area 304 into the zone 402 and the zone 412 for managing respectively. As shown in FIG. 4, In the first exemplary embodiment, the memory management unit 204 groups the physical units 304-(0)~304-(D) into the zone 402 having the physical units 304-(0)~304-(Z) and the zone 412 having the physical units 304-(Z+1)~304-(D) in a continuous method according to the sequence of the physical units 304-(0)~304-(D). In the case where the physical units are grouped in the continuous method, if the host system 1000 writes a great quantity of data into continuous logical units, the physical units of the data area in the same zone may be filled data and the valid data organization procedure must be performed.

However, in the present exemplary embodiment, the memory management unit 204 groups the physical units in a interleave method according to the sequence of the physical units.

Figure 21:
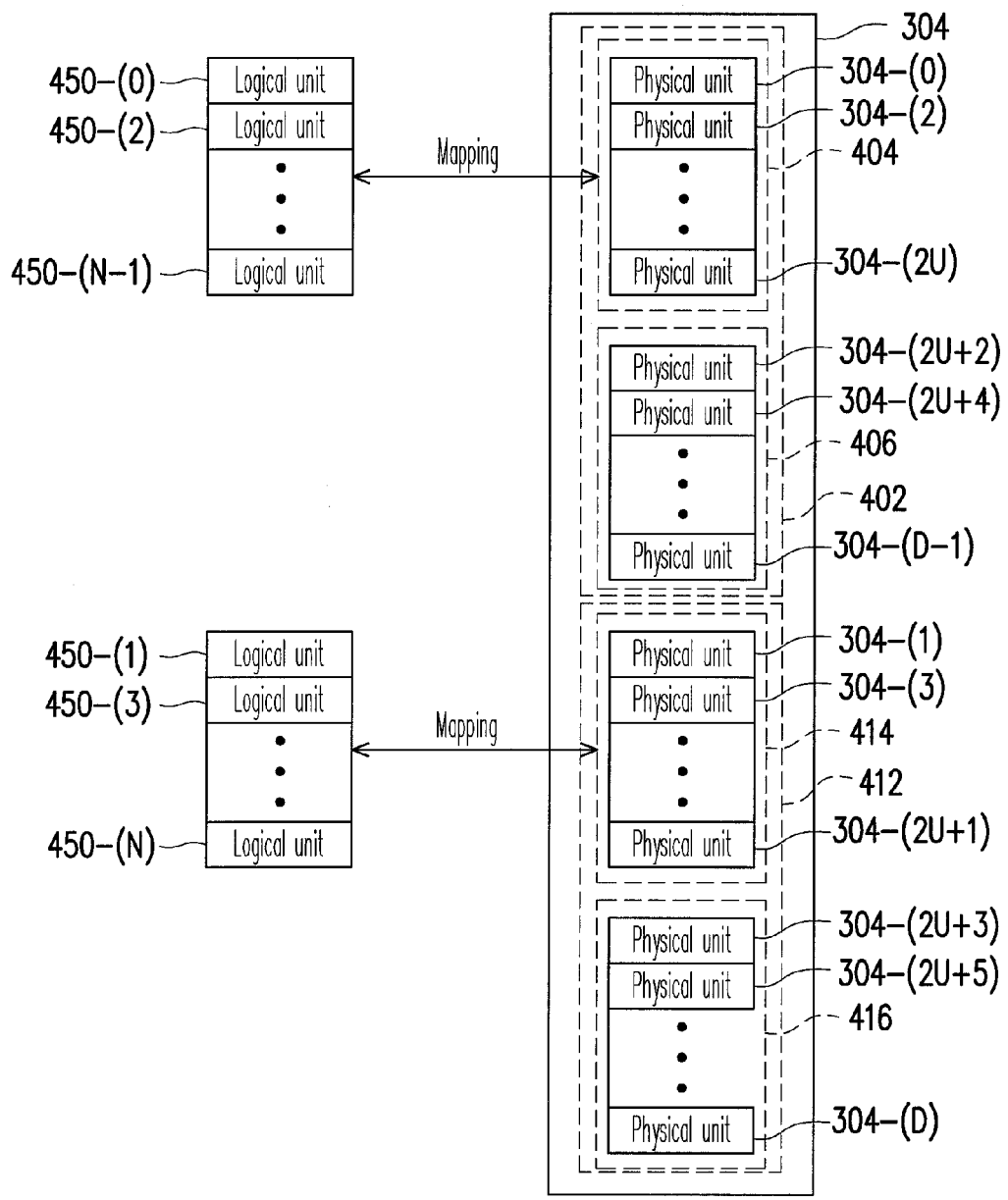
FIG. 21 is a diagram of managing physical units of a storage area according to the third exemplary embodiment of the present invention.

FIG. 21 is a diagram of managing physical units of a storage area according to the third exemplary embodiment of the present invention.

Referring to FIG. 21, the memory management unit 204 logically groups the physical units 304-(0)~304-(D) into the zone 402 and the zone 412, wherein the physical units whose serial numbers are even (e.g., the physical units 304-(0), 304-(2) . . . ) are grouped into the zone 402 and the physical units whose serial numbers are odd (e.g., the physical units 304-(1), 304-(3) . . . ) are grouped into the zone 412. And, the memory management unit 204 maps the configured logical units to the physical units in the interleave method. For example, the logical units whose serial numbers are even (e.g., the physical units 450-(0), 450-(2) . . . ) are mapped to the physical units of the zone 402 and the logical units whose serial numbers are odd (e.g., the physical units 450-(1), 450-(3) . . . ) are mapped to the physical units of the zone 412.

In the present exemplary embodiment, when the host system 1000 writes a great quantity of data into continuous logical units, the memory management unit 204 writes the data into the physical units in different zones dispersedly. Thus, in the present exemplary embodiment, data is dispersedly stored in several zones, and thus the number of times for organizing valid data is effectively reducing, thereby enhancing the performance of the flash memory storage apparatus.

In summary, the flash memory management method according to the exemplary embodiments of the present invention is capable of effectively reducing the number of times for organizing valid data, increasing the speed for writing data and enhancing the performance of a flash memory storage apparatus. The previously described exemplary embodiments of the present invention have the advantages aforementioned, wherein the advantages aforementioned not required in all versions of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A flash memory management method, for managing a plurality of physical units of a flash memory chip, the flash memory management method comprising:
at least grouping a portion of the physical units into a data area and a spare area;
configuring a plurality of logical units;
setting mapping relationships between the logical units and the physical units of the data area, wherein each of the logical units maps one of the physical units in the data area and each of the physical units of the spare area is unmappable to one of the logical units;
marking storage statuses of the physical units mapped to the logical units as empty statuses, respectively;
receiving a first data, wherein the first data belongs to a first logical unit among the logical units;
writing the first data into a first physical unit among the physical units of the data area, wherein the first physical unit of the data area is mapped to the first logical unit; and
marking the storage status of the first physical unit mapped to the first logical unit as a mother status;
receiving a second data, wherein the second data belongs to the first logical unit;
determining whether the first physical unit has enough storage space to store the second data;
determining whether a storage status of a second physical unit among the physical units of the data area is the empty status if the first physical unit has not enough storage space to store the second data; and
writing the second data into the second physical unit and marking the storage status of the second physical unit as a child status if the storage status of the second physical unit is the empty status, wherein the second physical unit of the data area maps to a second logical unit among the logical units and the second logical unit is different from the first logical unit, and
wherein when the storage status of the second physical unit is marked as the child status, the second physical unit of the data area does not store data belonging to the second logical unit.

2. The flash memory management method according to claim 1, further comprising:
receiving a third data, wherein the third data belongs to the second logical unit;
writing the third data into a third physical unit among the physical units of the data area, wherein the third physical unit of the data area maps to a third logical unit among the logical units;
re-mapping the third physical unit to the second logical unit;
re-mapping the second physical unit to the third logical unit; and
marking the storage status of the third physical unit mapped to the second logical units as the mother status,
wherein the third logical unit is different from the first logical unit and the second logical unit.

3. The flash memory management method according to claim 1, further comprising using a logical unit-physical unit mapping table to record the physical units mapped the logical units and the storage statuses of the physical units mapped the logical units.

4. The flash memory management method according to claim 1, further comprising grouping the logical units into a plurality of zones,
wherein each of the logical units has a plurality of logical addresses, and
at least two adjacent logical addresses are not continuous in each of the zones.

5. The flash memory management method according to claim 1, wherein each of the logical units has a plurality of logical addresses and each of the physical units has a plurality of physical addresses, wherein the first data belongs to a first logical address among the logical addresses of the first logical unit,
wherein the step of writing the first data into the first physical unit mapped to the first logical unit comprises:
writing the first data into a first physical address among the physical addresses of the first physical unit; and
recording a mapping relationship between the first logical address and the first physical address.

6. The flash memory management method according to claim 5, further comprising:

establishing at least one random table; and recording mapping relationships between the logical addresses and the physical addresses in the at least one random table.

7. The flash memory management method according to claim 5, further comprising:

when a host system stores data at one of the logical addresses, marking storage status of the physical address mapped to the one of the logical addresses as a valid data status; and when the host system deletes data at one of the logical addresses, marking storage status of the physical address mapped to the one of the logical addresses as an invalid data status.

8. The flash memory management method according to claim 1, wherein each of the logical units has a plurality of logical addresses and each of the physical units has a plurality of physical addresses, the physical addresses include a plurality of fast physical addresses and a plurality of slow physical addresses, and speed of writing data into the fast physical addresses is faster than speed of writing data into the slow physical addresses, the step of writing the second data into the second physical unit among the physical units of the data area comprises:

only using the fast physical addresses of the second physical unit to write the second data.

9. A flash memory controller for managing a plurality of physical units of a flash memory chip, the flash memory controller comprising:

a microprocessor unit;

a flash memory interface unit, coupled to the microprocessor unit, and configured to couple to the flash memory chip;

a host interface unit, coupled to the microprocessor unit and configured to couple to a host system; and a memory management unit, coupled to the microprocessor unit and configured to at least group a portion of the physical units into a data area and a spare area, wherein the memory management unit configures a plurality of logical units and sets mapping relationships between the logical units and the physical units of the data area, wherein each of the logical units maps one of the physical units in the data area and each of the physical units of the spare area is unmappable to one of the logical units, wherein the flash memory management unit respectively marks storage statuses of the physical units mapped to the logical units as empty statuses, wherein the host interface unit receives a first data, wherein the first data belongs to a first logical unit among the logical units, wherein the memory management unit writes the first data into a first physical unit among the physical units of the data area, wherein the first physical unit of the data area is mapped to the first logical unit and marks the storage status of the first physical unit as a mother status, wherein the host interface unit receives a second data and the second data belongs to the first logical unit, wherein the memory management unit determines whether the first physical unit has enough storage space to store the second data, wherein the memory management unit determines whether a storage status of a second physical unit among the physical units of the data area is the empty status if the first physical unit has not enough storage space to store the second data, wherein the memory management unit writes the second data into the second physical unit and marks the storage status of the second physical unit of the data area as a child status if the storage status of the second physical unit is the empty status, wherein the second physical unit maps to a second logical unit among the logical units and the second logical unit is different from the first logical unit, wherein when the storage status of the second physical unit is marked as the child status, the second physical unit of the data area does not store data belonging to the second logical unit.

10. The flash memory controller according to claim 9, wherein the host interface unit receives a third data, wherein the third data belongs to the second logical unit, wherein the memory management unit writes the third data into a third physical unit among the physical units of the data area, wherein the third physical unit of the data area maps to a third logical unit among the logical units, wherein the memory management unit re-maps the third physical unit to the second logical unit, re-maps the second physical unit to the third logical unit, and marks the storage status of the third physical unit mapped to the second logical unit as the mother status, wherein the third logical unit is different from the first logical unit and the second logical unit.

11. The flash memory controller according to claim 9, wherein the memory management unit uses a logical unit-physical unit mapping table to record the physical units mapped the logical units and the storage statuses of the physical units mapped the logical units.

12. The flash memory controller according to claim 9, wherein the memory management unit groups the logical units into a plurality of zones, wherein each of the logical units has a plurality of logical addresses, and at least two adjacent logical addresses are not continuous in each of the zones.

13. The flash memory controller according to claim 9, wherein each of the logical units has a plurality of logical addresses and each of the physical units has a plurality of physical addresses, wherein the first data belongs to a first logical address among the logical addresses of the first logical unit, wherein the memory management unit writes the first data into a first physical address among the physical addresses of the first physical unit and records a mapping relationship between the first logical address and the first physical address.

14. The flash memory controller according to claim 13, wherein the memory management unit establishes at least one random table and records mapping relationships between the logical addresses and the physical addresses in the at least one random table.

15. The flash memory controller according to claim 13, wherein when the host system stores data at one of the logical addresses, the memory management unit marks storage status of the physical address mapped to the one of the logical addresses as a valid data status, wherein when the host system deletes data at one of the logical addresses, the memory management unit marks storage status of the physical address mapped to the one of the logical addresses as an invalid data status.

16. The flash memory controller according to claim 9, wherein each of the logical units has a plurality of logical addresses and each of the physical units has a plurality of physical addresses, the physical addresses include a plurality of fast physical addresses and a plurality of slow physical addresses and speed of writing data into the fast physical addresses is faster than speed of writing data into the slow physical addresses, wherein the memory management unit only uses the fast physical addresses of the second physical unit to write the second data.

17. A flash memory storage system, comprising:

a flash memory chip, having a plurality of physical units;

a connector, configured to couple to a host system; and a flash memory controller, coupled to the flash memory chip and the connector, and configured to at least group a portion of the physical units into a data area and a spare area, wherein the flash memory controller configures a plurality of logical units and sets mapping relationships between the logical units and the physical units of the data area, wherein each of the logical units maps one of the physical units in the data area and each of the physical units of the spare area is unmappable to one of the logical units, wherein the flash memory controller respectively marks storage statuses of the physical units mapped to the logical units as empty statuses, wherein the flash memory controller receives a first data, wherein the first data belongs to a first logical unit among the logical units, wherein the flash memory controller writes the first data into a first physical unit among the physical units of the data area, wherein the first physical unit of the data area is mapped to the first logical unit and marks the storage status of the first physical unit as a mother status, wherein the flash memory controller receives a second data and the second data belongs to the first logical unit, wherein the flash memory controller determines whether the first physical unit has enough storage space to store the second data, wherein the flash memory controller determines whether a storage status of a second physical unit among the physical units of the data area is the empty status if the first physical unit has not enough storage space to store the second data, wherein the flash memory controller writes the second data into the second physical unit and marks the storage status of the second physical unit of the data area as a child status if the storage status of the second physical unit is the empty status, wherein the second physical unit maps to a second logical unit among the logical units and the second logical unit is different from the first logical unit, wherein when the storage status of the second physical unit is marked as the child status, the second physical unit of the data area does not store data belonging to the second logical unit.

18. The flash memory storage system according to claim 17, wherein the flash memory controller receives a third data, wherein the third data belongs to the second logical unit, wherein the flash memory controller writes the third data into a third physical unit among the physical units of the data area, wherein the third physical unit of the data area maps to a third logical unit among the logical units, wherein the flash memory controller re-maps the third physical unit to the second logical unit, re-maps the second physical unit to the third logical unit, and marks the storage status of the third physical unit mapped to the second logical unit as the mother status, wherein the third logical unit is different from the first logical unit and the second logical unit.

19. The flash memory storage system according to claim 17, wherein the flash memory controller groups the logical units into a plurality of zones, wherein each of the logical units has a plurality of logical addresses, and at least two adjacent logical addresses are not continuous in each of the zones.

\* \* \* \* \*